(No Model.) 2 Sheets—Sheet 1.
A. FRANK.
DISINFECTANT AND METHOD OF PREPARING THE SAME.
No. 310,130. Patented Dec. 30, 1884.
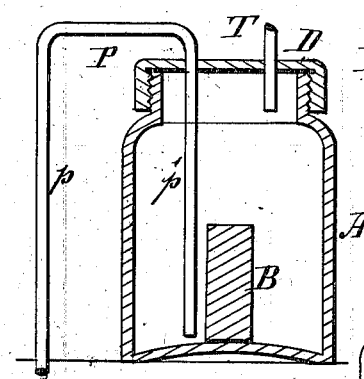
Fig. 3.
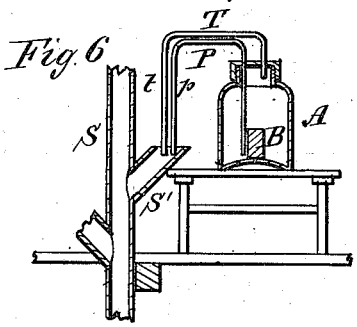
Fig. 6.
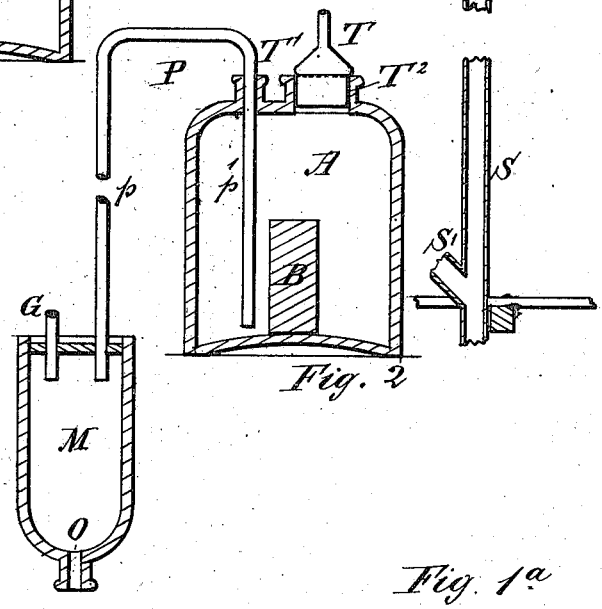
Fig. 2.
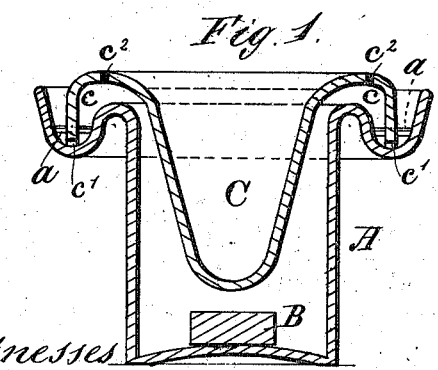
Fig. 1.
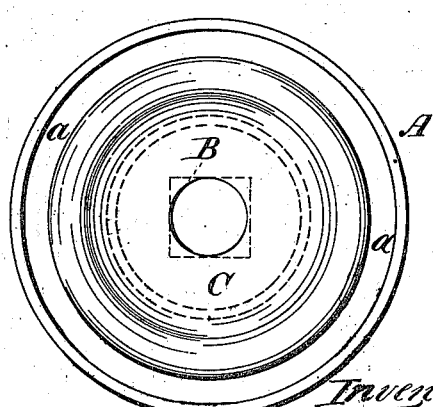
Fig. 1ª.
Witnesses
Inventor
Adolph Frank
by Henry Orth
his atty.

(No Model.) 2 Sheets—Sheet 2.
A. FRANK.
DISINFECTANT AND METHOD OF PREPARING THE SAME.
No. 310,130. Patented Dec. 30, 1884.
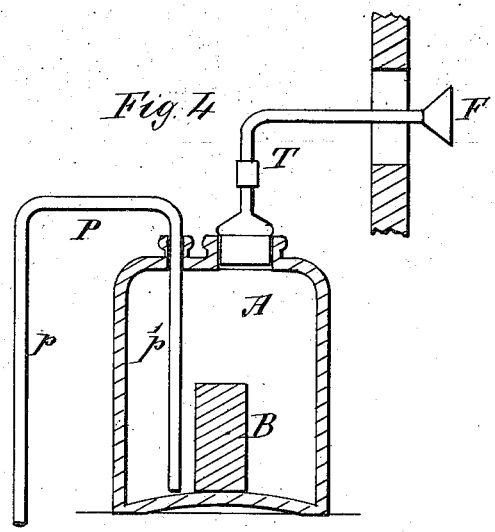
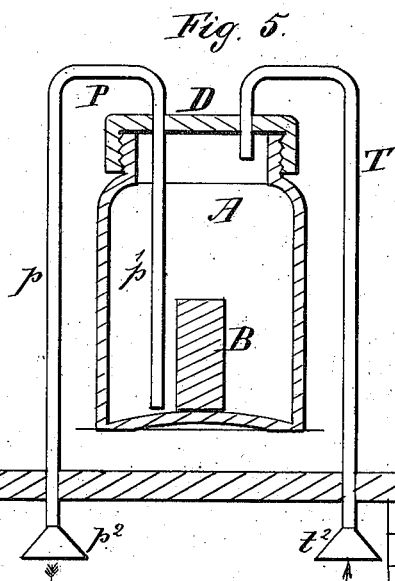
Witnesses
N. E. Boulter
G. W. Knotts
Inventor
Adolph Frank
Dr. Henry Orth
his atty.

UNITED STATES PATENT OFFICE.

ADOLPH FRANK, OF CHARLOTTENBURG, NEAR BERLIN, GERMANY.

DISINFECTANT AND METHOD OF PREPARING THE SAME.

SPECIFICATION forming part of Letters Patent No. 310,130, dated December 30, 1884.

Application filed August 8, 1883. (No specimens.) Patented in Germany February 19, 1882, No. 21,644, and May 11, 1883, No. 25,710.

*To all whom it may concern:*

Be it known that I, ADOLPH FRANK, doctor of philosophy, subject of the King of Prussia, residing at 80 Leibnitzstrasse, Charlottenburg, near Berlin, Germany, have invented certain new and useful Improvements in Methods of Storing, Transporting, and Utilizing Bromine; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The physical and chemical properties of bromine, or the bromides, especially the volatile combinations of iodine and chlorine, have heretofore presented obstacles to the general and extensive use of these chemicals, and notwithstanding the fact that bromine has been recognized as the most reliable and effective disinfectant.

The object of this invention is to overcome the difficulties heretofore encountered by producing bromine in a solid, safe, and readily-transportable form, from which any quantity required for any purpose may be measured off with facility. Furthermore, I avoid the too strong action or subsequent action of the fumes of bromine upon documents, fabrics, furniture, and other substances. To these ends I cause the bromine or its volatile combinations to be absorbed by porous bodies made of materials that are indifferent to the action of the chemical until such bodies have taken up all the bromine they are capable of absorbing. When such charged bodies are kept in air-tight vessels they retain their charge of bromine indefinitely, which latter is, however, completely eliminated from the absorbent by contact with atmospheric air, or other gases, or by immersing the brome-charged body in water or other fluid. Inasmuch as the bromine is held within the pores of the body by capillary attraction, the charged body may generally be handled with bare hands. As an absorbing agent or body I employ especially silicious earth (infusorial earth) or other indifferent body made in the form of bricks, balls, tablets, rods, &c. These porous bodies are preferably prepared in the manner as fully described in a pending application for patent filed on or about the 8th day of February, 1883, though they may be made of any other suitable material. Bodies made of fossiliferous earth, as described in said application, are capable of absorbing five times their own weight of bromine, and form solid and dry bodies, which give up the bromine by evaporation much more slowly than when the chemical is employed in a fluid state for disinfecting purposes. I generally employ absorbing agents made from fossiliferous earth saturated with about three times their weight of bromine, because I have found that under such conditions the bromine is better retained by the porous vehicle, and is given up thereby more uniformly, and also because such bodies may be handled with impunity. Bromine solutions for disinfecting, deodorizing, medicinal, chemical, or hygienic purposes may be obtained by placing the saturated porous bodies in water, to which may be added ten per cent. or more of bromide of potassium. The bromine is completely eliminated and taken up by the water until a saturated solution is obtained. To prevent the deleterious effects upon animal life or other bodies of an excess of bromine after disinfection or deodorizing, I employ the fluid products of the distillation of petroleum, which are evaporated within the room or other space disinfected. These vapors at once combine with the bromine and form neutral chemical combinations or bodies, whereby the deleterious effects of the bromine are neutralized and destroyed. In most cases it will be sufficient to introduce the porous vehicle saturated with bromine into the space (room or other) to be disinfected or deodorized. If, however, the defecation is to be a systematic one, and the distribution and action of the disinfectant is to be a uniform one under perfect control, the apparatus hereinafter described will be found of great advantage.

In the accompanying drawings, Figures 1, 2, 3, 4, 5, and 6 are sectional views of various forms of apparatus adapted for disinfecting or deodorizing purposes. Fig. 1ª is a plan view of Fig. 1.

In Figs. 1 and 1ª I have shown a simple arrangement of devices for use with a brome-saturated porous body or vehicle. A is a vessel in which the saturated vehicle or body B is placed. Such vessel may be of glass, porcelain, or other substance not affected by bromine or a bromide, and has at its upper end a groove or channel, a, for holding water or a solution of bromide of potassium. Within the channel a is seated the depending flange c, of an inverted-bell or cone cover C. The flange c of the cone or bell C is provided with notches or perforations c', so as to establish communication between the body of fluid in rear and in front of the flange c within the channel a. The bromine vapors, as they ascend around the cone C from the vehicle B, are absorbed and dissolved by the fluid in channel a and are gradually evaporated. If the evaporation of the bromine takes place too rapidly, it will condense upon the walls of the cone C, and, owing to the shape of the latter, the condensed bromine will be conducted back to the vehicle B. The evaporation of the bromine may be controlled—that is to say, it may be accelerated or retarded—by the introduction of a heating or a cooling agent into the hollow cone C.

To avoid the flow of the liquid from the channel a into the vessel A by reason of changes of pressure, the flange c of the cone may be provided with one or more small openings, c², closed normally by a cork, or by means of beeswax or paraffine or analogous substances. Such an apparatus is simply set in the room or other space to be disinfected.

As shown in Fig. 3, the vessel A, that contains the brome-saturated vehicle, is provided with a tube, T, which may be provided with a stop-cock or drawn out to a point. Through this tube air or other gas is admitted to the vessel A, and the heavy bromine vapors generated escape through the siphon-like pipe P and are disseminated throughout the space to be disinfected. The rapidity with which the bromine vapors will escape from the siphon will naturally depend upon the inflowing current of air or the length of the leg p of the siphon-pipe P. It is evident that the greater the flow of air into vessel A or the longer the leg p of pipe P the quicker will the bromine gases escape from A. The air-tube T may also be provided with a funnel, F, and said pipe may be extended to the outside of the structure in which the defecation or deodorization is to take place—as for instance, through a wall or window, and thus induce a natural current of air through vessel A and its pipes, as shown in Fig. 4. Such a construction of apparatus may be conveniently used for defecating or deodorizing railway-cars or vessels while under way, as the pressure of the air flowing through the funnel and pipe T into A will expel the bromine vapors from the latter through pipe P and disseminate the same in the compartment, cabin, or other space of such car or vessel.

In order to better mix the bromine vapors with air before admitting the same into the space to be disinfected, the discharge-pipe P may be connected with a mixing-vessel, M, as shown in Fig. 2, into which the bromine vapors are discharged from pipe P. The vapors, owing to their rapid flow, take up a certain volume of air admitted into M through a pipe, G, and the attenuated bromine vapors escape from the mixing-vessel through the opening O. The pipes T and P may be conducted into A by separate openings T' and T², as shown in Figs. 2 and 4, in which case one of the openings is made sufficiently large to admit of the introduction of the porous bodies saturated with bromine, or said pipes may be connected with the vessel A through the lid D, as shown in Fig. 3. In either case the connection will have to be made air-tight by any well-known means.

For disinfecting of cesspools, sewers, or sewer wells or traps, &c., I employ the apparatus shown in Fig. 5, which is so arranged as to act automatically to prevent the emanation of the foul gases which occurs or may occur periodically, according to the temperature and atmospheric pressure, whereby a special regulation or adjustment of the apparatus is not necessary.

A is the vessel containing the material saturated with bromine. The pipes T and P are here both bent into the form of siphons, their legs t and p, respectively, of equal length, passing through the cover of the sink or well or man-hole, and have their discharge and inlet openings t² and p² on the same horizontal plane, and said openings may be made in the form of funnels, as shown. The leg p' of pipe P that penetrates into the vessel A extends nearly to the bottom thereof, while the corresponding leg, t, of pipe T is considerably shorter. So long as there are no ascending currents of gases within the sink, well, or man-hole, an equilibrium within A will be established, and but little or no bromine vapors will escape therefrom. When, however, there exists an ascending current of gases in the sink, air will enter the vessel A through pipe T, while the specifically heavier bromine vapors will escape through the siphon-pipe P in a direction opposite to that of the ascending gases, to mix therewith and disinfect or disinfect and deodorize the same. When the upward flow of the gases ceases, and with it the pressure within the vessel A, the escape of bromine vapors will soon also cease or be reduced to a minimum. The same apparatus may be employed for disinfecting sink or cesspool pipes as shown in Fig. 6. The legs p t of the siphons P T are connected directly with the upper end of the stand-pipe S, which is closed at top, or with its branch pipes S', as shown. In this construction the legs of siphon P are of the same length, whereby the apparatus comes to rest more rapidly when the gases cease to rise. It is therefore preferable under some circumstances to make both legs of the siphon of the same length, although this is not indispensable to the good operation of the apparatus.

For purposes of cauterization by means of bromine vapors in surgical operations, or for other purposes, I employ the apparatus shown in Fig. 2. Air is forced into the vessel A through pipe T by means of any suitable air-forcing apparatus. A pipe having a rigid or movable and adjustable nozzle is connected with A, instead of the siphon P, by means of which the bromine vapors are conducted to the surface to be cauterized. A similar apparatus is or may be employed for disinfecting closed rooms or spaces, the access to which is difficult, or for disinfecting closed or locked packages or parcels, mail-pouches, &c.

To avoid the deleterious influence or effect of the bromine vapors on metals or other substances—such, for instance, as the bilge-pumps or machinery of vessels, &c.—I coat these with a thin layer of vaseline or other hydrocarbon of the paraffine group which are not affected by bromine.

Instead of pure bromine, any of the bromides—such as the chloride or iodide—may be employed as well as the volatile combinations of the bromine with chlorine and iodine, as will be readily understood.

I have herein described, and illustrated by the accompanying drawings, various devices by means of which my invention may be carried into practical effect, which devices I do not desire to claim in this application.

Having thus described my invention, what I claim, and desire to secure by Letters Patent of the United States, is—

1. The method, substantially as herein described, of storing bromine or its volatile combinations with chlorine or iodine, which consists in charging a porous silicious body with the chemical, as set forth.

2. The method, substantially as herein described, of disinfecting and deodorizing by utilizing bromine or its volatile combinations with chlorine or iodine, which consists in charging an indifferent porous mineral body with the same, bringing said body in contact with a liquid or gas in a closed vessel and allowing the impregnated fluid to gradually give up its bromine or volatile combinations of such, for the purposes specified.

3. The method, substantially as herein described, of utilizing bromine or its volatile combinations with chlorine or iodine, which consists in charging an indifferent porous mineral body with the chemical, volatilizing the same within a closed vessel, and distributing the vapor through the medium of a fluid to the atmosphere surrounding the vessel, for the purposes specified.

4. The method, substantially as herein described, of using bromine or its volatile combinations with chlorine or iodine, which consists in charging an indifferent porous mineral body with the chemical, volatilizing the same in contact with water containing bromide of potassium, for the purposes specified.

5. The method of disinfecting by means of bromine or its combinations, (fluid or other,) and counteracting the deleterious effects of the same, which consists in charging or saturating a neutral porous body with the chemical and exposing the charged body to the influence of a fluid combined with a volatile hydrocarbon, as described.

6. As an article of commerce, an indifferent porous mineral body charged with bromine or its volatile combinations with chlorine or iodine, substantially as and for the purpose specified.

In testimony whereof I affix my signature in presence of two witnesses.

ADOLPH FRANK.

Witnesses:
 GEORGE LOUBIER,
 B. ROI.